(12) United States Patent
Gehani

(10) Patent No.: US 12,679,065 B2
(45) Date of Patent: Jul. 14, 2026

(54) PROCESS FOR PRODUCTION OF FOAM LAMINATE PRODUCT

(71) Applicant: PROPRIETECT L.P., Mississauga (CA)

(72) Inventor: Neil P. Gehani, Mississauga (CA)

(73) Assignee: PROPRIETECT L.P., Toronto (CA)

( * ) Notice: Subject to any disclaimer, the term of this patent is extended or adjusted under 35 U.S.C. 154(b) by 187 days.

(21) Appl. No.: 14/948,981

(22) Filed: Nov. 23, 2015

(65) Prior Publication Data

US 2016/0151999 A1     Jun. 2, 2016

Related U.S. Application Data

(62) Division of application No. 13/148,641, filed as application No. PCT/CA2010/000165 on Feb. 9, 2010, now abandoned.

(Continued)

(51) Int. Cl.
*B32B 5/18*          (2006.01)
*B29C 43/00*       (2006.01)
(Continued)

(52) U.S. Cl.
CPC .............. *B32B 5/18* (2013.01); *B29C 43/003* (2013.01); *B29C 44/5681* (2013.01); *B29C 66/73182* (2013.01); *B32B 5/245* (2013.01); *B32B 5/28* (2013.01); *B32B 37/04* (2013.01); *B60R 13/0212* (2013.01); *B29K 2075/00* (2013.01); *B29K 2105/128* (2013.01); *B29L 2031/3023* (2013.01); *B32B 2305/022* (2013.01);
(Continued)

(58) Field of Classification Search
None
See application file for complete search history.

(56) References Cited

U.S. PATENT DOCUMENTS 5,549,776 A  *  8/1996  Juriga ................... B29C 43/203
156/228
5,683,796 A     11/1997  Komnylo et al.
(Continued)

FOREIGN PATENT DOCUMENTS

CA            2533692 A1      2/2005
DE    10 2007 007 554 B4     2/2013
(Continued)

OTHER PUBLICATIONS https://www.merriam-webster.com/dictionary/fiberglass—fiberglass definition (Year: 2026).*
(Continued)

*Primary Examiner* — Barbara J Musser
(74) *Attorney, Agent, or Firm* — KATTEN MUCHIN ROSENMAN LLP

(57) ABSTRACT

A laminate product comprising a foam core having a pair of opposed major surfaces and a cover layer secured with respect to each major surface is described. The cover layer contains a fibrous reinforcement layer that is substantially encapsulated by a polymer. It has been found that the use of a fibrous polymer layer (e.g., in place of conventional polyethylene film) results in a laminate product having significantly lower resistance to air flow resistance and significantly improved sound absorption properties.

22 Claims, 5 Drawing Sheets

| COVERSTOCK (17) |
| --- |
| FIBROUS POLYMER LAYER[1] (25) |
| FIBROUS REINFORCEMENT LAYER[2] (30) |
| FIBROUS POLYMER LAYER[1] (25) |
| FOAM CORE[3] (20) |
| FIBROUS POLYMER LAYER[1] (25) |
| FIBROUS REINFORCEMENT LAYER[2] (30) |
| FIBROUS POLYMER LAYER[1] (25) |
| POLYESTER SCRIM (15) |

[1]non-limiting examples: polyethylene, polypropylene, etc.

[2]non-limiting examples: fiberglass, natural fibers, basalt fibers, etc.

[3]non-limiting examples: polyurethane foam, polystyrene foam, polypropylene foam, etc.

Related U.S. Application Data

(60) Provisional application No. 61/202,249, filed on Feb. 10, 2009.

(51) Int. Cl.

| | |
|---|---|
| *B29C 44/56* | (2006.01) |
| *B29C 65/00* | (2006.01) |
| *B29K 75/00* | (2006.01) |
| *B29K 105/12* | (2006.01) |
| *B29L 31/30* | (2006.01) |
| *B32B 5/24* | (2006.01) |
| *B32B 5/28* | (2006.01) |
| *B32B 37/04* | (2006.01) |
| *B60R 13/02* | (2006.01) |

(52) U.S. Cl.

CPC ..... *B32B 2305/20* (2013.01); *B32B 2307/102* (2013.01); *B32B 2605/003* (2013.01); *Y10T 428/249953* (2015.04); *Y10T 428/249982* (2015.04)

(56) References Cited

U.S. PATENT DOCUMENTS

| | | | |
|---|---|---|---|
| 5,721,038 A | | 2/1998 | Komnylo et al. |
| 5,879,779 A | * | 3/1999 | Zafiroglu ................. D06N 3/14 |
| | | | 428/102 |
| 6,287,678 B1 | | 9/2001 | Spengler et al. |
| 6,368,702 B1 | | 4/2002 | Erickson |
| 7,591,346 B2 | | 9/2009 | Thompson, Jr. et al. |
| 2001/0046587 A1 | | 11/2001 | Michael et al. |
| 2004/0091615 A1 | | 5/2004 | Bopp et al. |
| 2004/0231914 A1 | | 11/2004 | Thompson et al. |
| 2004/0231915 A1 | * | 11/2004 | Thompson, Jr. .......... B32B 5/02 |
| | | | 181/290 |
| 2004/0234744 A1 | | 11/2004 | Byma et al. |
| 2004/0235378 A1 | | 11/2004 | Byma et al. |
| 2006/0237130 A1 | | 10/2006 | Thompson |
| 2007/0187032 A1 | | 8/2007 | Wang |
| 2008/0311336 A1 | | 12/2008 | Dolgopolsky et al. |
| 2010/0112881 A1 | * | 5/2010 | Bahukudumbi ......... D04H 1/54 |
| | | | 442/1 |

FOREIGN PATENT DOCUMENTS

| | | | |
|---|---|---|---|
| EP | 0 949 066 A2 | 10/1999 | |
| EP | 1803551 A1 | 7/2007 | |
| JP | S63-110139 U1 | 7/1988 | |
| JP | H02-018039 A | 1/1990 | |
| JP | 2002-529298 A | 9/2002 | |
| JP | 2002-535179 A | 10/2002 | |
| JP | 2002-331625 A | 11/2002 | |
| JP | 2007-500612 A | 1/2007 | |
| JP | 2007-511642 A | 5/2007 | |
| JP | 2007-168292 A | 7/2007 | |
| JP | 2008-539098 A | 11/2008 | |
| WO | 98/06600 A1 | 2/1998 | |
| WO | 00/27671 A1 | 5/2000 | |
| WO | 02/02325 A1 | 1/2002 | |
| WO | 2004/050429 A1 | 6/2004 | |
| WO | 2005/011974 A1 | 2/2005 | |
| WO | 2005/049670 A1 | 6/2005 | |
| WO | 2006/101175 A1 | 9/2006 | |
| WO | 2006/116842 A2 | 11/2006 | |

OTHER PUBLICATIONS https://en.wikipedia.org/wiki/Fiberglass—Wikipedia fiberglass entry (Year: 2026).*

Office Action for Canadian Patent Application No. 2,750,220 with a mailing date of Jul. 20, 2018.

Office Action for Canadian Patent Application No. 2,750,220 with a mailing date of Mar. 18, 2015.

Office Action for Canadian Patent Application No. 2,750,220 with a mailing date of Dec. 2, 2015.

The Fifth Office Action for Chinese Patent Application No. 201080007866.5 with a mailing date of Sep. 24, 2015.

The Fourth Office Action for Chinese Patent Application No. 201080007866.5 with a mailing date of Jun. 16, 2015.

Office Action for European Patent Application No. 10740866.8-1217 with a mailing date of Nov. 7, 2017.

Office Action for European Patent Application No. 10740866.8-1217 with a mailing date of Nov. 14, 2016.

Office Action for Indian Patent Application No. 5760/DELNP/2011 with a mailing date of Jul. 13, 2017.

Office Action for Japanese Patent Application No. 2011-549405 with a mailing date of Aug. 31, 2015.

English translation of an Office Action for Japanese Patent Application No. 2011-549405 with a mailing date of Dec. 3, 2013.

Office Action for Korean Patent Application No. 10-2017-7009078 with a delivery date of Jun. 21, 2017.

Office Action for Korean Patent Application No. 10-2011-7019274 with a delivery date of Feb. 22, 2016.

Office Action for Mexican Patent Application No. MX/a/2011/008320 with a mailing date of Nov. 28, 2016, and a summary of the office action in English.

M.C. Tubbs & P.N. Daniels, "Textile Terms and Definitions", 1991, The Textile Institute, Manchester M3 5DR (UK) p. 266.

Office Action for Canadian Patent Application No. 2,750,220 with a mailing date of Jun. 4, 2014.

The First Office Action for Chinese Patent Application No. 20108007866.5 with a mailing date of Jun. 19, 2013.

The Second Office Action for Chinese Patent Application No. 20108007866.5 with a mailing date of Jul. 3, 2014.

The Third Office Action for Chinese Patent Application No. 20108007866.5 with a mailing date of Dec. 17, 2014.

First Office Action for Japanese Patent Application No. 2011-549405 with a mailing date of Jan. 6, 2015.

Jul. 26, 2012 Office Action for Canadian Patent Application No. 2,750,220.

Communication: Publication of International Search Report for International Patent Application No. PCT/CA2010/000165, mailed Apr. 29, 2010.

* cited by examiner

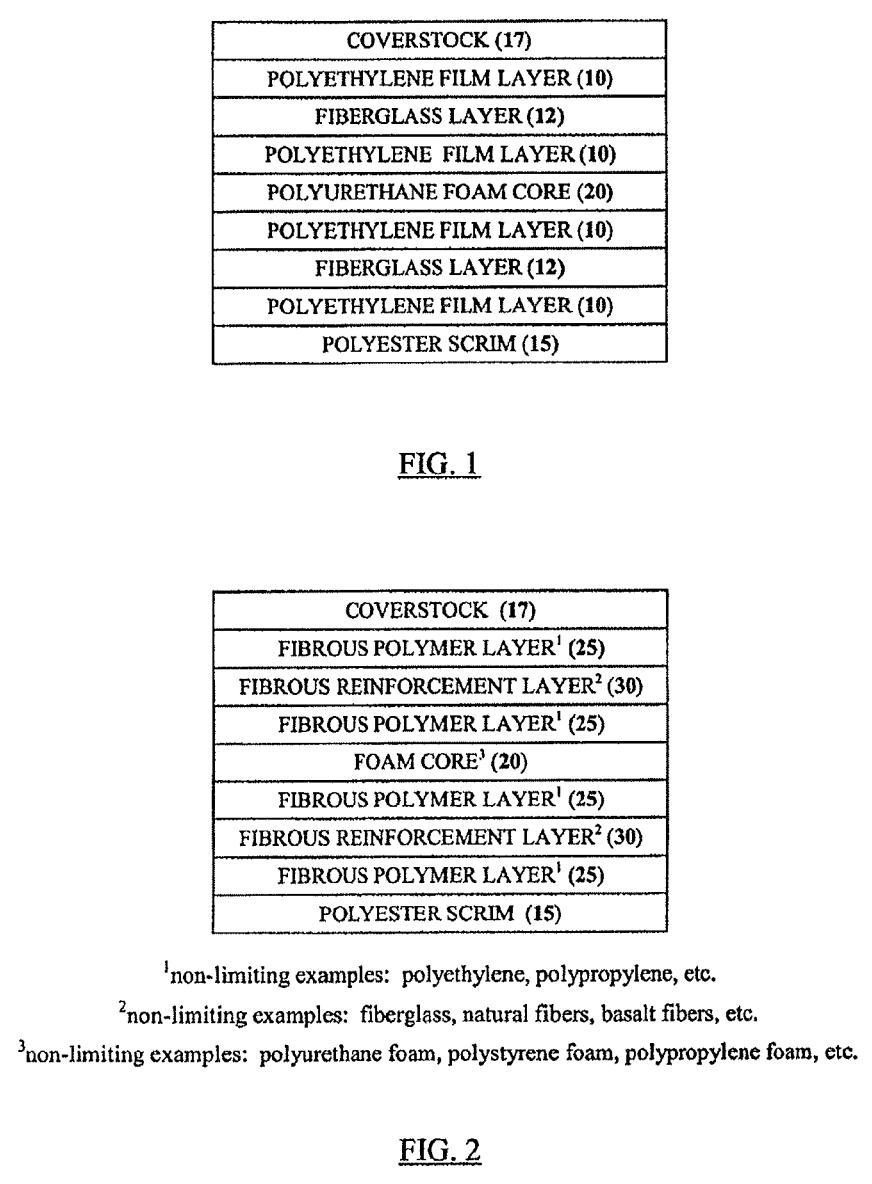

| COVERSTOCK (17) |
| --- |
| POLYETHYLENE FILM LAYER (10) |
| FIBERGLASS LAYER (12) |
| POLYETHYLENE FILM LAYER (10) |
| POLYURETHANE FOAM CORE (20) |
| POLYETHYLENE FILM LAYER (10) |
| FIBERGLASS LAYER (12) |
| POLYETHYLENE FILM LAYER (10) |
| POLYESTER SCRIM (15) |

FIG. 1

| COVERSTOCK (17) |
| --- |
| FIBROUS POLYMER LAYER[1] (25) |
| FIBROUS REINFORCEMENT LAYER[2] (30) |
| FIBROUS POLYMER LAYER[1] (25) |
| FOAM CORE[3] (20) |
| FIBROUS POLYMER LAYER[1] (25) |
| FIBROUS REINFORCEMENT LAYER[2] (30) |
| FIBROUS POLYMER LAYER[1] (25) |
| POLYESTER SCRIM (15) |

[1]non-limiting examples: polyethylene, polypropylene, etc.

[2]non-limiting examples: fiberglass, natural fibers, basalt fibers, etc.

[3]non-limiting examples: polyurethane foam, polystyrene foam, polypropylene foam, etc.

FIG. 2

PROCESS FOR PRODUCTION OF FOAM LAMINATE PRODUCT

CROSS-REFERENCE TO RELATED APPLICATION

The present application is a divisional of U.S. patent application Ser. No. 13/148,641, filed Nov. 16, 2011 now abandoned, which is a 371 of PCT/CA2010/00165, filed Feb. 9, 2010, which claims the benefit under 35 U.S.C. §119(e) of Provisional Patent Application No. 61/202,249, filed Feb. 10, 2009, the contents of each of which are hereby incorporated by reference.

BACKGROUND OF THE INVENTION

Field of the Invention

In one of aspects the present invention relates to a foam laminate product, more particularly such a product adapted for use in the interior of a vehicle. In another of its aspects, the present invention relates to process for the production of a foam laminate product. In a highly preferred embodiment, the present invention relates to a headliner, more particularly a vehicular headliner. In this preferred embodiment, an aspect of present invention relates to process for the production of a headliner.

Description of the Prior Art

Energy absorbing devices (also known as energy management devices) and structural devices are known. Such devices can take one of a variety of shapes and forms. Currently, one of the major applications for energy absorbing devices and/or structural devices is in vehicles, particularly automobiles. Such devices, when used in vehicles, would be of great convenience if they could be included in or substituted for trim panel and, indeed, are commonly referred to as trim panels.

In recent years, one particularly useful application of such energy absorbing devices and/or structural devices which has developed is in vehicular headliners. Vehicular headliners are generally known in the art. More particularly, automotive headliners are generally known in the art. In many case an automotive headliner will serve as a structural device and a device which combines both structural and energy absorbing properties.

As is known such automotive headliners are used to line the roof of the automobile. Conventionally, an automotive headliner is a laminate structure comprising, for example, a foam or other padded element having a cover material secured thereto. The cover material comprises a finished outer surface that faces the interior of the automobile and this the cover material is disposed adjacent or is comprised in the so-called A-surface of the headliner. The surface of the headliner adjacent the A-surface is the so-called B-surface. The B-surface of the headliner may or may not comprise a cover material.

Conventionally, foamed automotive headliners have made produced from isocyanate-based foams such as polyurethane foams.

When producing automotive headliners from polyurethane foams, it is conventional to utilize the so-called free-rise or slab polyurethane foams.

In a typical slab polyurethane foam production plant, the resultant foam is usually produced by dispensing a foamable composition into a trough having an open top (also known as a tunnel) and a conveyor bottom to move the composition away from the mixhead as the foam rises. Low pressure mixing is typically used and involves metering the components for foam production into a mixhead equipped with a stirrer (or other suitable agitation means) at a pressure generally less than 500 psi (usually 200-350 psi). The components are mixed in the mixhead and the foamable composition is expanded to produce polyurethane foam. As is known in the art, low pressure mixing is conventionally used to produce slabstock foam. It is known to vary the properties of the resulting foam by varying the nature and/or amount of one or more of the metered components.

Commercial slabstock polyurethane foam plants produce foam "buns" having dimensions such as 4 feet (height)×6 feet (width)×100 feet (length). Each bun is then cut into a plurality shorter length (e.g., 5 feet) buns, depending on the specifications of the particular automotive headliner being produced. The shorter length bun is then sliced into sheets of appropriate thickness (e.g., ⅛ to ½ inches). Each sheet is then covered, trimmed and secured in the automobile. It is also known in the art to subject each sheet to further processing steps such as thermoforming so to confer to the planar sheet a slightly contoured appearance which more closely assumes the shape of the roof of the automobile.

Thus, slabstock polyurethane foam conventionally used in the production of automotive headliners is known as a foam (e.g., a resilient foam) having at least one uncontoured surface (i.e., the foam is a "free-rise" foam).

U.S. Pat. Nos. 5,683,796 and 5,721,038 [both to Kornylo et al. (Kornylo)] teach a vehicular headliner made from molded polyurethane foam. The headliner taught by Kornylo purportedly comprises a substantially constant density while having central sections with a greater cross-sectional thickness than peripheral portions. The central sections must be relatively thick such that the headliner possesses acceptable sound absorbing properties while the peripheral portions must be relatively thin so as to facilitate securing of the headliner to the roof of the automobile.

International Publication Number WO 02/42119 [Zolfaghari] teaches an improvement to the headliner taught by Kornylo. Specifically, Zolfaghari teaches a vehicular headliner comprising energy management capabilities to improve vehicle occupant safety.

Regardless of the precise mode of production, it is conventional to reinforce the headliner using a fibrous reinforcement layer such as fibreglass. Typically the fibreglass is used in the form of a fibreglass mat or chopped fibreglass.

Conventionally, if the headliner is produced from slabstock foam, it is conventional to initially form a blank comprising a foam core, an adhesive layer consisting of polyethylene film on both sides of the foam core and fibreglass mat layer or chopped fibreglass on each adhesive layer (the blank may also comprise other layers such as a trim cover and the like). The blank is then subjected to a forming operation which serves to shape the foam core and adhere the fibreglass mats to each surface of the shaped foam core. Conventional forming operations include thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

Polyethylene (or other polymer) film is conventionally used as the adhesive in large part because it is readily available and is relatively inexpensive. The polyethylene (or other polymer) is in the form of an impermeable film that can selected from a variety of thicknesses.

The use polyethylene (or other polymer) film as an adhesive layer in the production of laminate products such as vehicular headliners gives rise to certain disadvantages. Specifically, in recent years, vehicle manufacturers are mandating that trim parts and panels used in the vehicles interior have improved acoustical properties to reduce cabin noise in the vehicle. In essence, this means that the trim parts and panels used in vehicles must have improved sound absorption properties, preferably without adversely affecting other properties of the trim parts and panels. This is especially desirable in the case of a vehicular headliner owing to its relatively large surface area.

When polyethylene (or other polymer) film is used as an adhesive layer in the production of laminate products such as vehicular headliners the resultant products have a relatively impervious/impermeable polymer layer or layers. This results in products that have relatively poor sound absorption properties. The poor sound absorption properties are related to the air flow resistance properties of the product. A product with high air flow resistance (i.e., relatively impermeable to the passage of air) tends to have relatively poor sound absorption properties whereas a product with low air flow resistance (i.e., relatively permeable to air) tends to have relatively good sound absorption properties.

Accordingly, there remains a need in the art for a laminate product that has relatively low air flow resistance and improved sound absorption properties. It would be advantageous if such a product did not significantly compromise other properties and could be readily produced using existing equipment. It would be further advantageous if such a product could be use to produce a relatively thin vehicular headliner having all requisite properties, together with improved sound absorption properties.

SUMMARY OF THE INVENTION

It is an object of the present invention to obviate or mitigate at least one of the above-mentioned disadvantages of the prior art.

Accordingly, in one of its aspects, the present invention provides a laminate product comprising a foam core having a pair of opposed major surfaces and a cover layer secured with respect to each major surface, the cover layer comprising a fibrous reinforcement layer that is substantially encapsulated by a polymer, the laminate product having an air flow resistance as measured in accordance with ASTM C522 of less than about 6,000 mks Rayls.

A process for producing a laminate foam product having a pre-determined shape, the process comprising the steps of:
  positioning a blank in a heating device, the blank comprising a foam core having a pair of opposed major surfaces and a cover layer disposed on each major surface, each cover layer comprising at least one fibrous reinforcing layer and at least one fibrous polymer layer;
  heating the blank at temperature above the melting point of the at least one fibrous polymer layer to cause polymer to substantially encapsulate the at least one fibrous layer and adhere each cover layer to the foam core.

Thus, the present inventor has discovered a novel laminate product having a desirable combination of properties. While it has been conventional to use fibrous polymeric materials in the production of laminate products, this has typically been in the form of the use of so-called non-woven scrim layer. When a scrim layer has been conventionally used, it has been done so in a manner which avoids melting of the scrim during production of the laminate product. The present inventor has discovered a counter-intuitive technique wherein the fibrous polymer layer (in the form of a scrim or some other form) is actually used as a melt adhesive to substantially encapsulate and adhere a fibrous reinforcing layer to the foam core. The result is a laminate product having a very desirable lower air flow resistance measured according to ASTM C522. Such a laminate product has improved acoustical properties.

The following additional advantages accrue from the present invention:
  allows for the replacement of conventional polyethylene film with, in a preferred embodiment, a polypropylene scrim;
  the effect limited production availability of conventional polyethylene film is reduced or avoided;
  the preferred fibrous polymer layer is a non-woven polypropylene or a polypropylene-based scrim—this is available from a number of sources and is significantly less expensive than the conventional polyethylene film;
  the fibrous polymer layer can be made available in a number of different weights and colours;
  the present invention allows for the production of thinner and/or lighter laminate products (e.g., for use in vehicular headliners) which have improved acoustical properties; and
  the present laminate product has a relatively low air flow resistance when measured within accordance with ASTM C522.

During the present process, a blank (as described herein) is heated to a temperature above the melting point of the fibrous polymeric layer. With or without applied pressure, the melted fibrous polymer layer then substantially encapsulates the fibrous reinforcement layer while maintain a porous structure that is believed to result in relatively low air flow resistance and improved sound absorption properties.

While a preferred embodiment of the present invention is directed to application in vehicular foam parts, such as vehicular headliners, it will be appreciated by those of skill in the art that scope of the invention is not restricted to such applications. Thus, it may be possible to use the invention in other applications such as floorboards, cargo vehicle mats, Tonneau covers, and other applications where it is desirable to have a relatively lightweight article which has energy absorbing and/or structural properties equivalent to articles made using fiberglass reinforcement.

BRIEF DESCRIPTION OF THE DRAWINGS

Embodiments of the present invention will be described with reference to the accompanying drawings, wherein like reference numerals denote like parts, and in which:

FIG. 1 illustrates a schematic of a prior art foam laminate product in the form a layered structure or blank prior to product of the foam laminate product;

FIG. 2 illustrates a schematic of a preferred foam laminate product in accordance with a preferred embodiment of the present invention in the form a layered structure or blank prior to product of the foam laminate product.

DETAILED DESCRIPTION OF THE PREFERRED EMBODIMENTS

Figure 3:
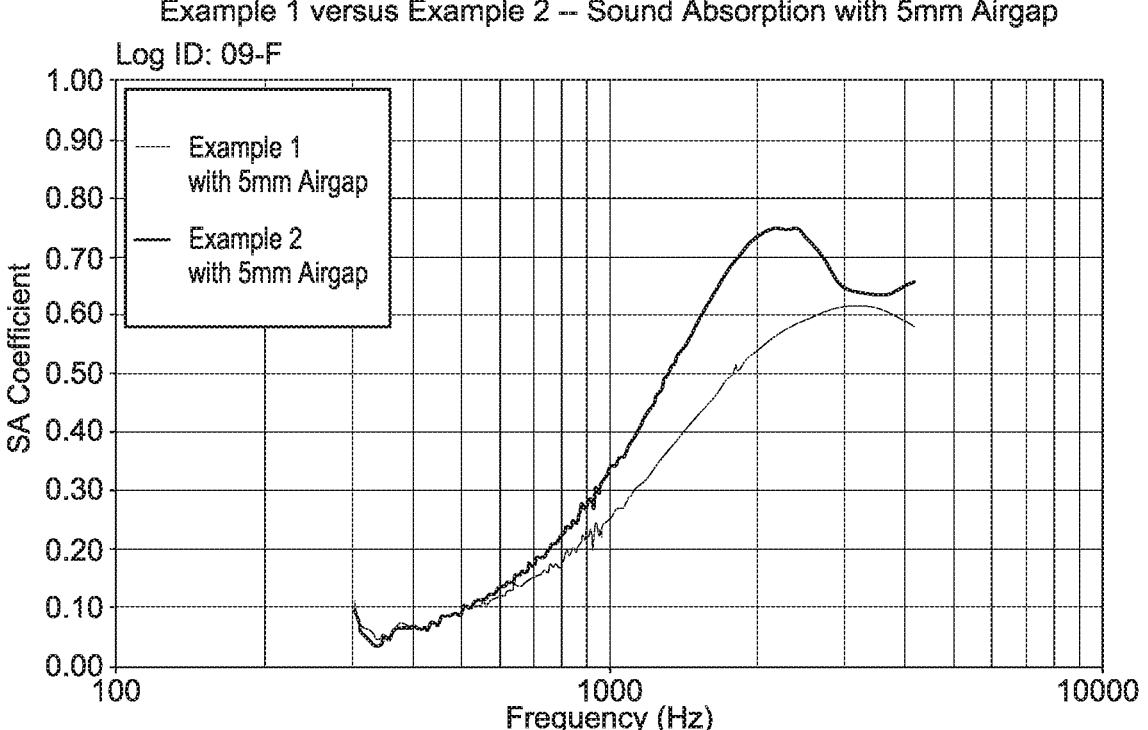
FIGS. 3-6 the sound absorption properties of various foam laminate products produced in the Examples.

The preferred foam for use in the core portion of the present laminate product is a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

Typically, the foamed isocyanate-based polymer is produced from a reaction mixture which comprises an isocyanate and an active hydrogen-containing compound.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$Q'(NCO)_i]_j$$

wherein both i and j are integers having a value of 2 or more, and Q' is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 100 to about 10,000, more preferably from about 100 to about 4,000, most preferably from about 100 to about 3,500.

If the core portion is to comprise a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 100 and a functionality of from 1 to 25.

Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups.

Typically, the amination step replaces the majority but not all of the hydroxyl groups of the polyol.

The reaction mixture used to produce the foamed isocyanate-based polymer core portion typically will further comprise a blowing agent. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

To produce the core portion made from a foamed isocyanate-based polymer, a catalyst is usually incorporated in the reaction mixture. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

Preferably, the foam core portion of the present laminate product comprises an compression force deflection at 10% deflection in the range of from about 2 psi to about 200 psi when measured pursuant to ASTM 3574-D, more preferably in the range of from about 5 psi to about 100 psi when measured pursuant to ASTM 3574-D most preferably, in the range of from about 10 psi to about 80 psi when measured pursuant to ASTM 3574-D. Throughout this specification, when reference is made to ASTM 3574-D, the test sample has the following dimensions: 2 ft.×2 ft.×1 in. (last dimension is the thickness).

Non-limiting and preferred examples of suitable polyurethane foams for use in producing the present headliner are available from Woodbridge Foam Corporation under the tradename Stratas.

Generally, the polyurethane foam suitable for use in the present headliners and having desirable energy management and/or structural characteristics may be produced from the following general non-limiting formulation:

| Component | Amount |
|---|---|
| Polymer Polyol | 100-0 parts |
| Polyol | 0-100 parts |
| Crosslinker | 0-30 parts/100 parts total polyol |
| Catalyst | 0.05 to 3.5 parts/100 parts total polyol |
| Silicone Surfactants | 0-1.5 parts/100 parts total polyol |
| H$_2$O | 0.5 to 25 parts/100 parts total polyol |
| Isocyanate | Adequate quantity for an index of from about 0.60 to 1.30 ratio of NCO equivalents to the equivalents of NCO reactive sites. |

Suitable crosslinkers, catalysts and silicone surfactants are described in U.S. Pat. Nos. 4,107,106 and 4,190,712. The preferred polyurethane foam suitable for use in the present headliner may be produced from the following formulation:

| Component | Amount |
|---|---|
| Polymer Polyol | 20-100 parts |
| Polyol | 0-80 parts |
| Crosslinker | 5-15 parts/100 parts total polyol |
| Catalyst | 0.5-1.2 parts/100 parts total polyol |
| Silicone Surfactants | 0.3-1.1 parts/100 parts total polyol |
| H$_2$O | 1.75-2.75 parts/100 parts total polyol |
| Isocyanate | Adequate quantity for an index of from about 0.8 to 1.1 ratio of NCO equivalents to the equivalents of NCO reactive sites. |

Typically, the foamed isocyanate-based polymer is produced from a reaction mixture which comprises an isocyanate and an active hydrogen-containing compound. The foam core in the present laminate product may have a substantially uniform density—this is typically a characteristic of a molded foam (i.e., a foam produced by constraining the expanding mass on all surfaces as it is converted to the foam product). Alternatively, and preferably, the foam core has a variable density—this is typically a characteristic of a slab foam (i.e., a foam produced by a process in which at least one surface of the expanding mass is unconstrained so that the mass may "free rise" as it is converted to the foam product) after conventional forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

Preferably, the foam core in the present laminate product has a density in the range of from about 0.5 to about 30 pounds per cubic foot, more preferably in the range of from about 1 to about 20 pounds per cubic foot, even more preferably in the range of from about 2 to about 15 pounds per cubic foot, most preferably in the range of from about 2 to about 8 pounds per cubic foot.

Preferably, the foam core used in the present laminate product comprises a thickness of greater than or equal to about 2 mm, more preferably from about 2 mm to about 20 mm, more preferably from about 3 mm to about 15 mm, even more preferably 1 from about 3 mm to about 12 mm, even more preferably from about 3 mm to about 8 mm, most preferably from about 3 mm to about 6 mm.

The present laminate product further comprises a cover layer disposed on opposed surfaces of the foam core portion. The cover layer comprising a fibrous reinforcement layer that is substantially encapsulated by a polymer.

Preferably, a first cover layer is adhered by the polymer to a first major surface of the foam core and a second cover layer is adhered by the polymer to a second major surface of the foam core. One or both of the first cover layer and the second cover layer may comprise a single fibrous reinforcement layer.

Alternatively, one or both of the first cover layer and the second cover layer may comprise a plurality of fibrous reinforcement layers.

Preferably, one or both of the first cover layer and the second cover layer each independently comprise from 1 to 15 fibrous reinforcement layers, more preferably from 1 to 12 fibrous reinforcement layers, more preferably from 1 to 10 fibrous reinforcement layers, most preferably from 1 to 5 fibrous reinforcement layers.

Preferably, the polymer that substantially encapsulates the at least one fibrous reinforcement layer comprises an organic polymer. The organic polymer may be selected from a thermoplastic polymer, an elastomeric material and a thermosetting material.

Preferably, the polymer is selected from the group consisting of a polyolefin, a polyester, a nylon, poly(vinyl choride), a polyurethane, a polyacrylate, a latex, a styrene-butadiene polymer, a nitrile-butadiene polymer, a silicone polymer, mixtures thereof, copolymers thereof and interpenetrating networks thereof.

In a more preferred embodiment, the polymer comprises a polyolefin. The polyolefin may be selected from the group consisting of a homopolymer, a copolymer and a terpolymer derived from the polymerization of at least one olefin monomer.

Non-limiting examples of the olefin monomer may be selected from the group comprising $\alpha$-olefin monomers, diolefin monomers and polymerizable monomers containing at least one internal olefin linkage.

In one embodiment, the olefin monomer comprises an $\alpha$-olefin monomer. Non-limiting examples of the $\alpha$-olefin monomer may be selected from the group propylene, 1-butene, isobutene, 1-pentene, 1-hexene, 1-octene, branched isomers thereof, styrene, $\alpha$-methylstyrene and mixtures thereof. Preferably, the $\alpha$-olefin monomer comprises propylene.

In another embodiment, the olefin monomer comprises a diolefin monomer.

In one embodiment, the diolefin monomer comprises an aliphatic compound. Non-limiting examples of such a diolefin monomer may be selected from the group comprising 1,3-butadiene, isoprene, 2,3-dimethyl-1,3-butadiene, 2-ethyl-1,3-butadiene, piperylene, myrcene, allene, 1,2-butadiene, 1,4,9-decatrienes, 1,4-hexadiene, 1,6-octadiene, 1,5-hexadiene, 4-methyl-,1,4-hexadiene, 5-methyl-1,4-hexadiene, 7-methyl-octa-1,6-diene-1,6, phenylbutadiene, pentadiene and mixtures thereof.

In another embodiment, the diolefin monomer comprises a bicyclic compound. Non-limiting examples of such a diolefin monomer may be selected from the group comprising norbornadiene, alkyl derivatives thereof, 5-alkylidene-2-norbornene compounds, 5-alkenyl-2-norbornene compounds and mixtures thereof. More preferred embodiments of such a diolefin monomer may be selected from the group comprising 5-methylene-2-norbornene, 5-ethylidene-2-norbornene, 5-propenyl-2-norbornene 1,4-cyclohexadiene, 1,5-cyclooctadiene, 1,5-cyclododecadiene, methyltetrahydroindene, dicyclopentadiene, bicyclo[2.2.1]hepta-2,5-2,5-diene and mixtures thereof.

When the polyolefin is a copolymer, it may be derived from polymerization of a mixture of ethylene and at least one a-olefin, preferably from polymerization of a mixture of ethylene and propylene. The mixture may comprise from about 30 to about 75 ethylene and from about 25 to about 70 weight percent $\alpha$-olefin, preferably from about 35 to about 65 ethylene and from about 35 to about 65 weight percent $\alpha$-olefin, more preferably from polymerization of a mixture of ethylene, at least one $\alpha$-olefin and at least one diolefin monomer.

When the polyolefin is a terpolymer derived from polymerization of a mixture of ethylene, propylene and one or both of 5-ethylidene-2-norbornene 1,5-hexadiene and 1,5-hexadiene. The mixture may comprise from about 0.5 to about 15 weight percent of the diolefin monomer, more preferably from about 1 to about 10 weight percent of the diolefin monomer.

In a more preferred embodiment the polyolefin is selected from the group comprising polypropylene, ethylene-propylene copolymers, polyethylene and mixtures thereof. The most preferred polyolefin is polypropylene.

The polyolefin may have a molecular weight (Mn) in the range of from about 10,000 to about 100,000, more preferably from about 20,000 to about 80,000, most preferably from about 40,000 to about 60,000.

The present laminate product has an air flow resistance as measured in accordance with ASTM C522 of less than about 6,000 mks Rayls, more preferably less than about 5,750 mks Rayls, more preferably less than about 5,500 mks Rayls, more preferably less than about 5,250 mks Rayls, more preferably less than about 5,000 mks Rayls, more preferably from about 500 to about 5,000 mks Rayls, more preferably, from about 500 to about 4,500 mks Rayls, more preferably from about 500 to about 4,000 mks Rayls, more preferably from about 500 to about 3,000 mks Rayls, more preferably from about 700 to about 2,700 mks Rayls, most preferably from about 500 to about 1,500 mks Rayls.

The fibrous reinforcement layer may be made from nature fibers or synthetic fibers. The melting point (if any) of the fibers used in the fibrous reinforcement layer should be greater than the melting point of the polymer used to substantially encapsulate the fibrous reinforcement layer. The fibrous reinforcement layer may be constructed from fibrous materials such as fibreglass, natural fibers (e.g., hemp, burlap, etc), basalt fibers, nylon fibers, composites of two or more of these and the like.

The preferred method for producing the present laminate product will now be discussed. Prior to this discussion, there will be a brief discussion of the prior art approach to producing a vehicular headliner.

Thus, with reference to FIG. 1, there is illustrated in schematic form, the various layers of materials used in the production of a conventional headliner product. These components include a foam core 20 having its major surfaces covered by two cover layers. Each cover layer consists of a single fibreglass mat 12 interposed between a pair of polyethylene film layers 10. One of the cover layers also includes a scrim layer 15 while other cover layer includes a cover-stock material 17.

When it is desired to produce the vehicular headliner material, a stack or blank containing the layers described above is placed in a conventional thermoforming device (or other a shaping device) after which the stack or blank is subjected to heat and pressure (sequentially or concurrently) for a sufficient time such that polyethylene film layers 10 serve to permeate into fibreglass mat 12 and also serve to adhere the cover layers to foam core 20. Thereafter, or concurrently, foam core 20 is shaped to the desired shape of the vehicular headliner. The resulting product is relatively impervious/impermeable to air flow since polyethylene film layers 10 tend to remain impervious/impermeable even after they have permeated into fibreglass mat 12.

With reference to FIG. 2, there is illustrated, in schematic form, the layers used in a preferred embodiment of the present laminate product. As shown, polyethylene film layers 10 used in the conventional approach (FIG. 1) have been replaced with a fibrous polymer layer 25. A fibrous reinforcement layer 30 interposed between a pair of Fibrous polymer layers 25. One of the cover layers also includes a scrim layer 15 while other cover layer includes a coverstock material 17.

Thus, the major surfaces of foam core 20 are covered by a cover layer. In the illustrated embodiment, each cover layer consists of a single fibrous reinforcement layer which is interposed between a pair of fibrous polymer layers 25. Those of skill in the art will appreciate that, for a given cover layer, it is possible (and in some cases preferred) to have pairs of fibrous polymer layer 25 and fibrous reinforcement layer 30 with an extra fibrous polymer layer 25 to create a stack or blank having N fibrous reinforcement layers and greater than N (N+1 or more) fibrous polymer layers.

Foam core 20, fibrous polymer layers 25 and fibrous reinforcement layers 30 may be selected from the materials described hereinabove.

Fibrous reinforcement layer 30 may be used as one or more sheet or mat-like materials. Alternatively, fibrous reinforcement layer 30 may be used in the form of loose (e.g., chopped) fibres. The fibrous mat-like material may contain polymer material, and/or layers of fibrous polymer, to bind and/or to encapsulate the fibers (prefabricated skin). This contemplates the case where a composite skin containing layers of fibrous polymer and reinforcement fibers is prefabricated and then used to make the product, or even as a product on its own which can be used, for example, as a component for wet process or dry process headliners.

It will be appreciated that the fibrous polymer layer may be woven or non-woven. Further information on such materials may be found on the following websites: http://www.nonwovens-group.com, http://www.johnrstarr.com and http://www.inda.org. Preferably, the fibrous polymer layer is non-woven and, more preferably, is spun-bound. Alternatively, other non-woven fibrous polymer layers such as staple-fiber, meltblown and blends thereof may be used. Further, in some cases, it may be desirable to pre-treat the fibrous polymer layer to enhance adhesion strength of that layer to the foam core. For example, it may be desirable to subject the fibrous polymer layer to a surface treatment such as corona treatment, plasma treatment and the like.

The most preferred fibrous polymer layer for use in producing the present laminate product is non-woven, spunbound polypropylene.

Preferably, the fibrous polymer layer has a basis weight of from about 0.1 to about 4.0 oz/yd$^2$, more preferably from about 0.5 to about 2.5 oz/yd$^2$, more preferably from about 0.8 to about 2.8 oz/yd$^2$, most preferably from about 1.0 to about 2.3 oz/yd$^2$.

One or both of each cover layer independently may comprise a single fibrous reinforcement layer or a plurality of fibrous reinforcement layers. Preferably, one or both of the first cover layer and the second cover layer independently comprises from 1 to 15 fibrous reinforcement layers, more preferably from 2 to 12 fibrous reinforcement layers, more preferably from 2 to 10 fibrous reinforcement layers, most preferably from 2 to 5 fibrous reinforcement layers.

When it is desired to produce the present laminate product, a stack or blank similar to the one shown in FIG. 2 is disposed in a conventional forming or shaping device such as a device capable of carry out forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo* '99 (1999).

The stack or blank is then subjected to a temperature that exceeds the melting point of fibrous polymer layer 25 in the shaping device at a pressure and for period of time sufficient to cause fibrous polymer layers 25 to melt and substantially encapsulate fibrous reinforcement layer 30. Thereafter or concurrently, foam core 20 assumes the pre-determined shape (contoured or planar) of the laminate product. Thus, during the process, each of fibrous polymer layers 25 permeates into adjacent fibrous reinforcement layers 30 with the result that the latter are substantially completely encapsulated by the former and the combination is adhered to foam core 20.

During the process, fibrous polymer layers 25 melt or otherwise become flowable to wet out, fully permeate and/or substantially encapsulate fibrous reinforcement layer(s) 30. By using fibrous polymer layers 25 (instead of polyethylene film layers 10 described above in connection with FIG. 1), the resulting foam laminate product contains a polymer layer that maintains a degree of porosity which allows for lower air flow resistance and improved sound absorption properties.

The heating step in the present process is conducted at a temperature greater than the melting point of the fibrous polymer layer. For example, if the fibrous polymer layer is a polypropylene scrim (the most preferred embodiment), the heating step may be conducted at approximately 165° C. Typically, the heating step is conducted at a temperature of at least about 100° C., more preferably in the range of from about 100° C. to about 250° C., even more preferably from about 110° C. to about 250° C., most preferably from about 110° C. to about 200° C.

It is possible to conduct the process using a two step lamination approach. In this approach, the stack or blank is placed in flat-bed laminator (e.g., a Meyer Laminator) and heated under pressure to produce an initial laminate product. This initial laminate product is then placed in a second laminator that heats (e.g., infrared heat) and shapes the initial laminate product to produce the final product. An example of the second laminator is described in U.S. Pat. No. 5,928,597 [Van Ert], U.S. Pat. No. 6,146,578 [Van Ert el al.] and U.S. Pat. No. 6,338,618 [Van Ert et al.].

Alternatively, in some applications for the present laminate product, it is possible to conduct the process using a one step approach—e.g., a flat bed laminator, a laminator that accomplishes lamination and shaping in a single piece of equipment and the like.

Embodiments of the present invention will now be described with reference to the following Examples which are provided for illustrative purposes only and should not be used to limit or construe the invention.

In the Examples, the following materials were used:

CF—Core foam (thickness=5.5 mm)—polyurethane foam having a density of 40 kg/m³ commercially available from Woodbridge Foam Corporation under the tradename Stratas 1825™;

PE—Polyethylene (HDPE) film having a thickness of 2 mil corresponding to 1.5 oz/yd² (47 g/m²) conventionally used in the product of foam laminate products;

FPL#1—Fibrous polymer layer—spun-bound, non-woven polypropylene scrim—1.0 oz/yd² (33 g/m²);

FPL#2—Fibrous polymer layer—spun-bound, non-woven polypropylene scrim—2.25 oz/yd² (75 g/m²);

SCM—Scrim—spun-bound polyester scrim 1.0 oz/yd²; and

FRL—Fibrous reinforcement layer—chopped strand fiberglass mat—80 g/m².

EXAMPLES 1-3

Example 1 was produced using a blank having the following lay-up:

| |
| --- |
| PE |
| FRL |
| PE |
| FC |
| PE |
| FRL |
| PE |
| SCM |

Example 1 is provided for comparative purposes only and is outside the scope of the present invention.

Examples 2 and 3 were produced using blanks having the following lay-ups:

| Example 2 | Example 3 |
| --- | --- |
| FPL#1 | FPL#2 |
| FRL | FRL |
| FPL#1 | FPL#2 |
| FC | FC |
| FPL#1 | FPL#2 |
| FRL | FRL |
| FPL#1 | FPL#2 |
| SCM | SCM |

Each blank or stack was manually passed through a flat bed laminator, consisting of an adjacent heating zone and cooling zone. The process parameters for lamination were as follows:

line speed: 9 m/min-12 m/min;
hot Platens temp.: 175° C.-240° C.;
pressure roller offset: 1.8 mm;
plate height 5.2 mm; and
cold platens temperature: 20° C.-45° C.

The resulting samples were conditioned for 24 hours.

Thereafter the samples were heated and shaped in a laminator such as the one described in U.S. Pat. No. 5,928,597 [Van Ert], U.S. Pat. No. 6,146,578 [Van Ert el al.] and U.S. Pat. No. 6,338,618 [Van Ert et al.] to produce the final form of the samples. The process conditions for this part of the process were as follows:

infrared oven power: 75 to 90% of heater output;
infrared oven dwell time: 50 to 100 seconds;
substrate surface temperature: 185° C.-200° C.;
substrate core temperature: 185° C.-200° C.;

forming press pressure: 1-4 inches Hg; and
forming press time: 50-80 seconds.

The maximum load and stiffness (both at room temperature) of the samples was measured according to Honda Specification 8302Z-S84-0000. The air flow resistance of the samples was measured according to ASTM C522. The results of these physical tests are reported in Table 1, together with the weight of each sample.

Quite surprisingly, in comparing the results for Examples 1 and 2, these results show that a lighter laminate product can be made with significantly lower air flow resistance while maintaining maximum load and stiffness properties. Such a product would present a significant improvement to know laminate products.

A comparison of results for Examples 1 and 3 shows that the laminate product of Example 3 is heavier, it has significantly greater maximum load while still achieve a significant reduction in air flow resistance compared to Example 1. Such a product would have use in an application where the added weight is tolerable given the maximum load that can be absorbed.

The sound absorption coefficient of the samples for Examples 1 and 2 was measured according to ASTM E1050 using a conventional testing apparatus that provided an air gap of 5 mm or 10 mm. The results are illustrated in FIGS. 3 (5 mm air gap) and 4 (10 mm air gap). As illustrated, these results illustrate the sample produced in Example 2 (invention) had relatively high sound absorption coefficient at higher frequency when compared with the sample produced in Example 1 (comparative). This high sound absorption coefficient translates into improved sound absorption properties for the sample produced in Example 2 (invention) compared to the that produced in Example 1 (comparative).

EXAMPLES 4-5

Typically, the foamed isocyanate-based polymer is produced from a reaction mixture which comprises an isocyanate and an active hydrogen-containing compound.

Examples 4 and 5 were produced using the methodology used in Examples 1-3 and blanks having the following lay-ups:

| Example 4 | Example 5 |
| --- | --- |
| PE | FPL#1 |
| FRL | FRL |
| PE | FPL#1 |
| PE | FPL#1 |
| FRL | FRL |
| PE | FPL#1 |
| FC | FC |
| PE | FPL#1 |
| FRL | FRL |
| PE | FPL#2 |
| SCM | SCM |

Example 4 is provided for comparative purposes only and is outside the scope of the present invention.

Figure 4:
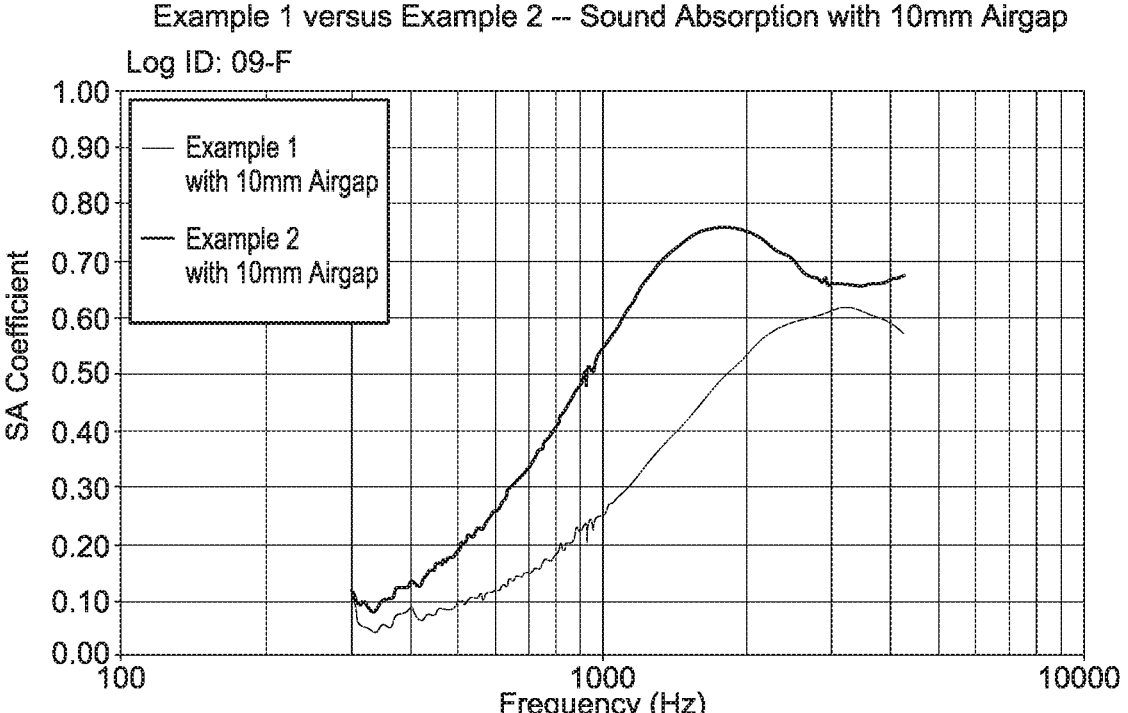

The result samples were subjected to the same physical testing reporting in connection with Examples 1-3 and the results are reported in Table 2 (weight, maximum load, strength and air flow resistance) and FIG. 4 (sound absorption).

The same trends reported in connected with the results for Examples 1-3 are seen in the results for Examples 4-5.

EXAMPLES 6-7

Examples 6 and 7 were produced using the methodology used in Examples 1-3 and blanks having the following lay-ups:

| | Example 6 | Example 7 |
|---|---|---|
| | PE | FPL#1 |
| | FRL | FRL |
| | PE | FPL#1 |
| | FRL | FRL |
| | PE | FPL#1 |
| | FC | FC |
| | PE | FPL#1 |
| | FRL | FRL |
| | PE | FPL#2 |
| | SCM | SCM |

Example 6 is provided for comparative purposes only and is outside the scope of the present invention.

Figure 5:
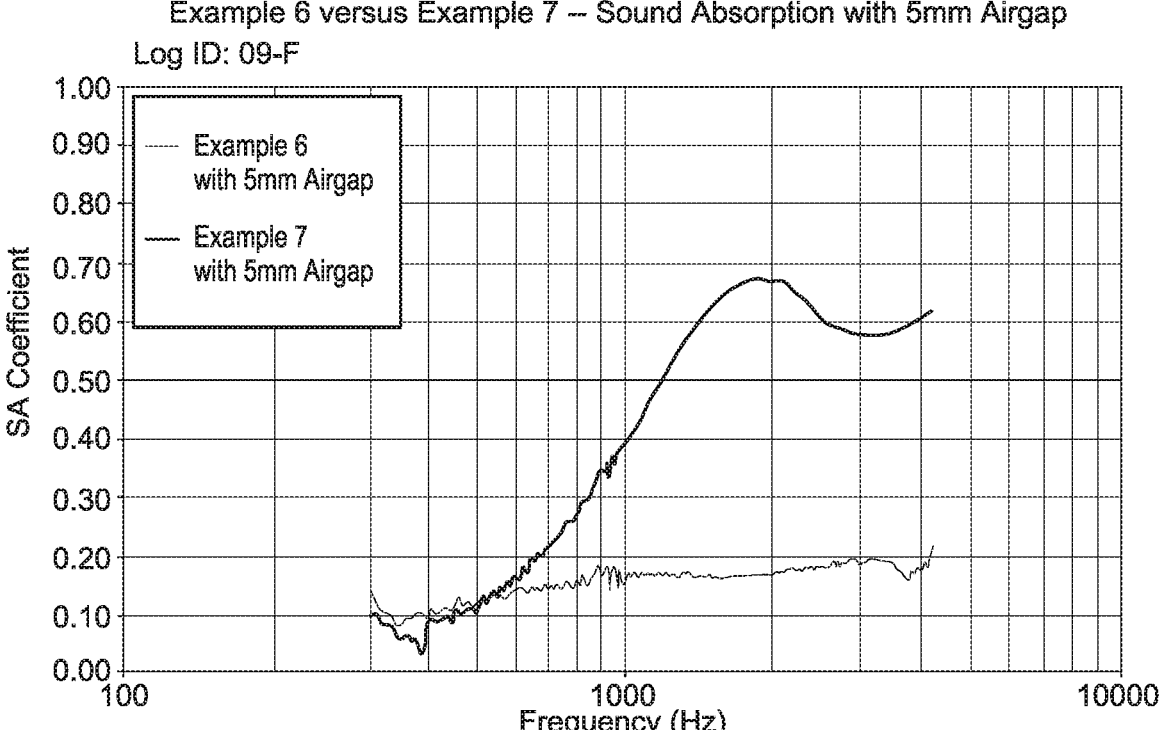
Figure 6:
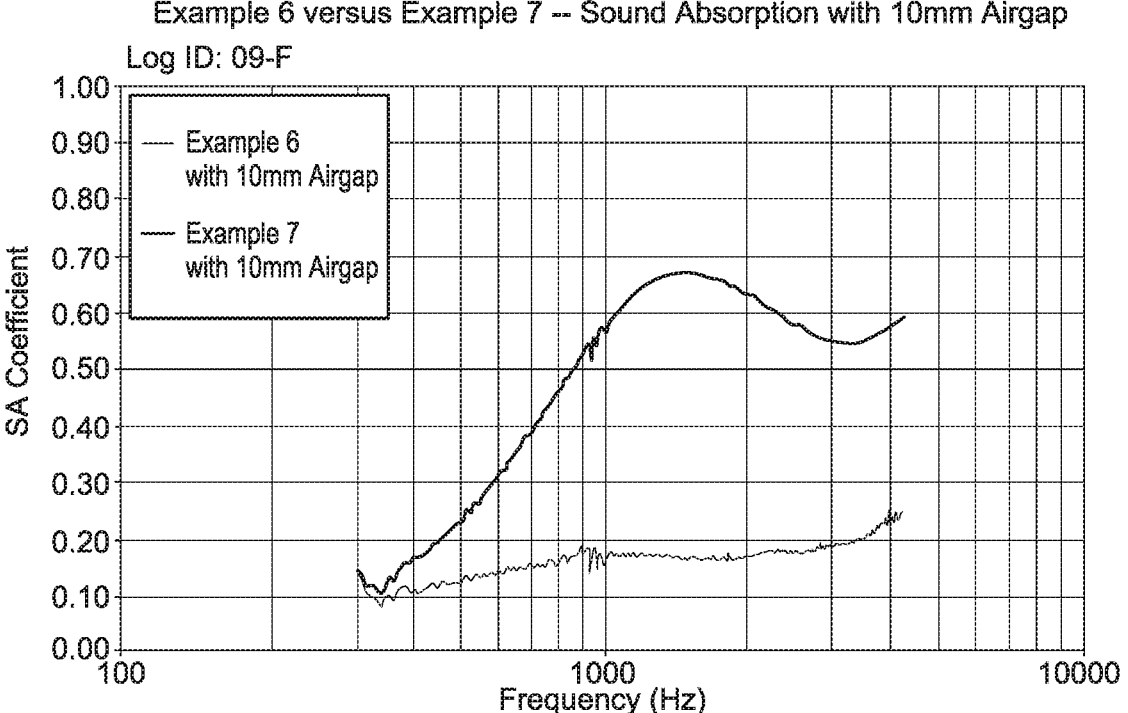

The result samples were subjected to the same physical testing reporting in connection with Examples 1-3 and the results are reported in Table 3 (weight, maximum load, strength and air flow resistance) and FIGS. 5 and 6 (sound absorption, air gap of 5 mm and 10 mm, respectively). The same trends reported in connected with the results for Examples 1-3 are seen in the results for Examples 6-7.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, if it is desired to produce the present laminate product from a molded foam core, this can be achieved by forming and shaping the cover layers from the stacks referred to in FIG. 2 independently of the foam core. The foam core could be molded independently of the cover layers (i.e., the conversion of the foamable composition to the foam core would be completed in a mold constraining all surfaces of the foam core) and the formed elements can then be adhered to each other with conventional adhesive. Further, it is possible to include a finishing or trim cover on one major surface of the present laminate product thereby producing a finished part. Still further, it is possible to add other elements to the foam laminate product during production thereof. For example, it is possible to incorporate one or more of: (i) an electrically conduct layer in the foam laminate product to provide a heating function, (ii) a sound absorbing layer to further improve acoustical performance of the foam laminate product, and/or (iii) a flame retardant layer to improve flame retardant properties of the foam laminate. Still further, while the Examples illustrate product of a preferred embodiment of the present laminate product using a two-step lamination approach (i.e., flat bed laminator followed heat/shaping in a separate laminator), it will be apparent that, depending on the final application for the laminate product to is possible to use a one step lamination approach—e.g., using a flat bed laminator, a laminator that accomplishes lamination, heating and shaping in a single piece of equipment, and the like. It is therefore contemplated that the appended claims will cover any such modifications or embodiments.

All publications, patents, patent applications and subject matter on Internet website referred to herein are incorporated by reference in their entirety to the same extent as if each individual publication, patent or patent application was specifically and individually indicated to be incorporated by reference in its entirety.

TABLE 1

| | Example 1 | Example 2 | Example 3 |
|---|---|---|---|
| Weight (g/m$^2$) | 601 | 545 | 710 |
| Maximum load (N) | 22.4 | 21.3 | 30.1 |
| Stiffness (N/mm) | 10.7 | 11.3 | 12.7 |
| Air flow resistance (mks Rayels) | 21845 | 1566 | 5493 |

TABLE 2

| | Example 4 | Example 5 |
|---|---|---|
| Weight (g/m$^2$) | 775 | 691 |
| Maximum load (N) | 39.0 | 39.0 |
| Stiffness (N/mm) | 14.5 | 14.2 |
| Air flow resistance (mks Rayels) | 6160 | 2427 |

TABLE 3

| | Example 6 | Example 7 |
|---|---|---|
| Weight (g/m$^2$) | 728 | 658 |
| Maximum load (N) | 38.3 | 35.5 |
| Stiffness (N/mm) | 14.9 | 14.2 |
| Air flow resistance (mks Rayels) | 7037 | 2214 |

What is claimed is:

1. A process for producing a laminate foam product having a pre-determined shape, the process comprising the steps of:

positioning a blank in a heating device, the blank comprising a foam core having a pair of opposed major surfaces and one or more cover layers disposed on each major surface, each cover layer comprising at least one fiberglass reinforcing layer, which is made of fiberglass containing a polymer material, and at least one spunbound fibrous polypropylene scrim layer, the blank being free of polyethylene film;

heating the blank at temperature above the melting point of the at least one spunbound fibrous polypropylene scrim layer for a period of time sufficient to cause polymer of the at least one spunbound fibrous polypropylene scrim layer to wet out, fully permeate and substantially encapsulate the at least one fiberglass reinforcing layer and make each cover layer adhere to the foam core, wherein the encapsulated at least one fiberglass reinforcing layer is configured to maintain an air flow resistance of the laminate foam product, as measured in accordance with ASTM C522, to be less than about 6,000 mks Rayls.

2. The process defined in claim 1, comprising the further step of: shaping the blank to assume pre-determined shape.

3. The process defined in claim 2, wherein said heating step and said shaping step are conducted concurrently.

4. The process defined in claim 2, wherein said heating step and said shaping step are conducted sequentially.

5. The process defined in claim 2, wherein said heating step is conducted prior to said shaping step.

6. The process defined in claim 1, wherein at least one of the cover layers on each major surface comprises two or more spunbound fibrous polypropylene scrim layers.

7. The process defined in claim 1, wherein each cover layer comprises two or more spunbound fibrous polypropylene scrim layers.

8. The process defined in claim 1, wherein at least one of the cover layers on each major surface comprises two or more fibrous reinforcement layers.

9. The process defined in claim 1, wherein each cover layer comprises two or more fibrous reinforcement layers.

10. The process defined in claim 1, wherein the at least one spunbound fibrous polypropylene scrim layer is non-woven.

11. The process defined in claim 1, wherein the heating step causes a first cover layer to adhere, by the spunbound fibrous polypropylene scrim layer, to a first major surface of the foam core and a second cover layer to adhere, by the spunbound fibrous polypropylene scrim layer, to a second major surface of the foam core.

12. The process defined in claim 11, wherein at least one of the first cover layer and the second cover layer comprises a single fibrous reinforcement layer.

13. The process defined in claim 11, wherein each of the first cover layer and the second cover layer comprises a single reinforcement layer.

14. The process defined in claim 11, wherein at least one of the first cover layer and the second cover layer comprises a plurality of fibrous reinforcement layers.

15. The process defined in claim 11, wherein each of the first cover layer and the second cover layer comprises a single fibrous reinforcement layer.

16. The process defined in claim 11, wherein at least one of the first cover layer and the second cover layer independently comprises from 1 to 15 fibrous reinforcement layers.

17. The process defined in claim 11, wherein each of the first cover layer and the second cover layer independently comprises from 1 to 10 fibrous reinforcement layers.

18. The process defined in claim 11, wherein each of the first cover layer and the second cover layer independently comprises from 1 to 5 fibrous reinforcement layers.

19. The process defined in claim 1, wherein the foam core comprises a thickness in the range of from about 3 mm to about 15 mm.

20. The process defined in claim 1, wherein the spunbound fibrous polypropylene scrim layer has the basis weight of from about 1.0 to about 2.3 $oz/yd^2$.

21. The process defined in claim 1, wherein the spunbound fibrous polypropylene scrim layer has the basis weight of from about 0.8 to about 2.8 $oz/yd^2$.

22. A process for producing a laminate foam product having a pre-determined shape, the process comprising the steps of:

positioning a blank in a heating device, the blank comprising a foam core having a pair of opposed major surfaces and one or more cover layers disposed on each major surface, each cover layer comprising at least one fiberglass reinforcing layer, which is made of fiberglass containing a polymer material, and at least one spunbound fibrous polypropylene scrim layer arranged in an alternating fashion such that there are N fiberglass reinforcing layers, each of which is made of fiberglass containing a polymer material, and N+1 spunbound fibrous polypropylene scrim layers and N is an integer equal to 1 or more, the spunbound fibrous polypropylene scrim layer having a basis weight of from about 0.8 to about 2.8 $oz/yd^2$, the blank being free of polyethylene film;

heating the blank at temperature above the melting point of the at least one spunbound fibrous polypropylene scrim layer for a period of time sufficient to cause polymer of the at least one spunbound fibrous polypropylene scrim layer to wet out, fully permeate and substantially encapsulate the at least one fiberglass reinforcing layer and make each cover layer adhere to the foam core, wherein the encapsulated at least one fiberglass reinforcing layer is configured to maintain an air flow resistance of the laminate foam product, as measured in accordance with ASTM C522, to be in the range of from about 700 to about 2,700 mks Rayls.

\* \* \* \* \*